United States Patent
Keefover et al.

(10) Patent No.: US 7,570,046 B2
(45) Date of Patent: Aug. 4, 2009

(54) SINGLE SENSING MULTIPLE OUTPUT SYSTEM

(75) Inventors: Robert D. Keefover, Lake Orion, MI (US); Todd Peterson, New Boston, MI (US); John W. Duddles, Clarkston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 940 days.

(21) Appl. No.: 10/685,336

(22) Filed: Oct. 14, 2003

(65) Prior Publication Data

US 2005/0077893 A1 Apr. 14, 2005

(51) Int. Cl.
*G01B 7/14* (2006.01)
*G01B 7/30* (2006.01)
*G01P 3/48* (2006.01)

(52) U.S. Cl. .............. 324/207.12; 324/207.2; 327/510

(58) Field of Classification Search ............ 324/207.12, 324/207.2, 207.25, 166, 173–174; 338/32 H, 338/32 R; 327/510, 511
See application file for complete search history.

(56) References Cited

U.S. PATENT DOCUMENTS

| 4,703,261 | A | | 10/1987 | Berchtold |
| 5,136,880 | A | | 8/1992 | Norgauer |
| 5,373,206 | A | * | 12/1994 | Lim .................... 310/68 B |
| 5,525,901 | A | * | 6/1996 | Clymer et al. ......... 324/207.21 |
| 6,075,371 | A | | 6/2000 | Kitamura et al. |
| 6,404,188 | B1 | * | 6/2002 | Ricks ................. 324/207.22 |
| 6,552,531 | B1 | * | 4/2003 | Fey et al. ............. 324/207.12 |
| 6,693,419 | B2 | * | 2/2004 | Stauth et al. .......... 324/207.12 |
| 6,701,788 | B2 | * | 3/2004 | Babala .................. 73/649 |
| 2003/0163241 | A1 | | 8/2003 | Kondo |

FOREIGN PATENT DOCUMENTS

EP 1 111 343 A1 6/2001

* cited by examiner

*Primary Examiner*—Reena Aurora
(74) *Attorney, Agent, or Firm*—Warn Partners, P.C.

(57) ABSTRACT

A sensing system for a vehicle that includes a single sensor element and multiple outputs. An engine controller is responsive to the multiple outputs, output circuits and a supervisor circuit in the system monitors the sensor element and shared circuits. If the sensor element fails, or if a connector fails or if the supervisor circuit indicates a circuit failure, one or more of the outputs will go outside of their normal operating range into a diagnostics range to allow the engine controller to take the appropriate action.

31 Claims, 2 Drawing Sheets

SINGLE SENSING MULTIPLE OUTPUT SYSTEM

BACKGROUND OF THE INVENTION

1. Field of the Invention

This invention relates generally to a sensing system including a single sensor element and multiple sensor outputs and, more particularly, to a sensing system in a vehicle that employs a single sensor element and multiple sensor outputs, where the system uses the multiple outputs for diagnostic purposes.

2. Discussion of the Related Art

Sensing systems are employed in vehicles for sensing the condition, position, performance, etc. of certain vehicle systems and devices. For example, sensing systems are used for sensing throttle plate position in an electronic throttle body of a vehicle. When an operator of the vehicle presses the accelerator pedal, the accelerator pedal position is detected. The throttle plate position is sensed by a sensing system that provides an output signal to the engine controller of the position. The engine controller provides the proper amount of fuel and air to operate the engine at the desired speed.

Sensor systems of this type can employ two sensor elements for redundancy purposes. The two sensor elements provide two separate sensor output signals to the engine controller. The two output signals are typically different relative to each other, such as having reversed slopes, truncated slopes, etc., so that the two output signals change differently under normal conditions during the sensing operation. The engine controller compares the two output signals to make a determination as to whether the sensors and associated circuitry are operating properly. If one of the sensors fails, or sensor circuitry fails, or sensor connections fail, the corresponding output signal will go out of its normal operating range relative to the other sensor output signal or into a diagnostic range. For example, if a change in the supply voltage to one of the sensor elements changes, its output signal will behave differently than if the supply voltage was unaffected. By comparing the two sensor output signals, the engine controller will thus know if the sensing system is operating properly.

Each sensor element and its associated circuitry are typically provided in a separate circuit, where redundant sensors require two separate chips. This adds additional cost to the system because of the cost of the circuits. It would be desirable to provide two sensor output signals from a sensing system of this type for sensing system diagnostic purposes, yet only have a single sensor element and its associated circuitry on a single chip.

SUMMARY OF THE INVENTION

In accordance with the teachings of the present invention, a sensing system is disclosed that includes a single sensor element with multiple output signals, such as two output signals. The sensing system includes shared circuits that are shared by all of the output circuits, such as amplifiers, oscillators, analog-to-digital and digital-to-analog converters, etc. A controller is responsive to the multiple output signals, and a supervisor circuit on the chip monitors the sensing element and the shared circuits.

If the sensor element fails, all of the output signals will go outside of their normal operating range, and thus the controller can take the appropriate action for a failed system. If one of the connectors for one of the output circuits fails, the controller will receive one output signal that is outside the normal operating range of the system relative to the other output circuit, and one output signal that is within the normal operating range, and can take the appropriate action for such a situation. If one of the shared circuits fails, the supervisor circuit will cause all of the output signals to go outside the normal operating range, also providing an indication to the controller of a problem for diagnostic purposes.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a sensing system including a single sensor element and multiple sensor outputs in merely exemplary in nature, and is in no way intended to limit the invention or its applications or uses. For example, the sensing system discussed herein has particular application for sensing a system or device in a vehicle, for example, a throttle plate position. However, as will be appreciated by those skilled in the art, the sensing system of the invention will have a much wider application.

Figure 1:
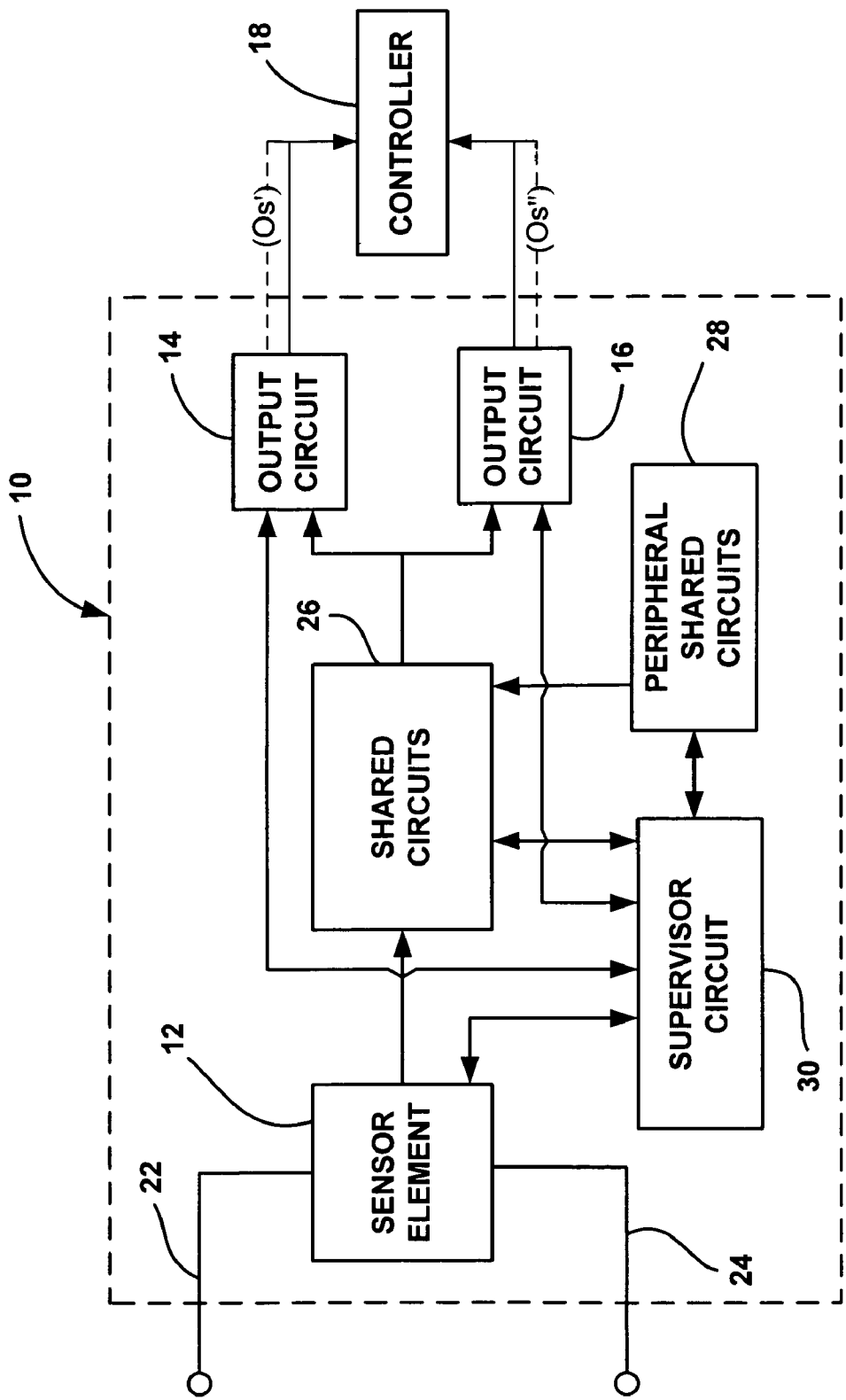
FIG. 1 is a schematic block diagram of a sensing system including one sensor element and multiple outputs, according to an embodiment of the present invention.

FIG. 1 is a schematic block diagram of a sensing system 10 that includes a single sensor element 12 and multiple output signals from a first output circuit 14 and a second output circuit 16. The output signals from the output circuits 14 and 16 are provided to a controller 18, such as an engine controller on a vehicle. The sensing system 10 measures or detects a certain parameter. In one embodiment, the sensing system 10 senses a vehicle parameter, such as a throttle plate position. The sensor element 12 can be any sensor element suitable for any of these applications, such as a Hall-effect sensor, an inductive sensor, a magneto-resistive sensor, a potentiometer, encoders, etc. The sensor element 12 receives a supply voltage input, such as 5 volts, on a supply line 22 and is coupled to ground on line 24.

Figure 2:
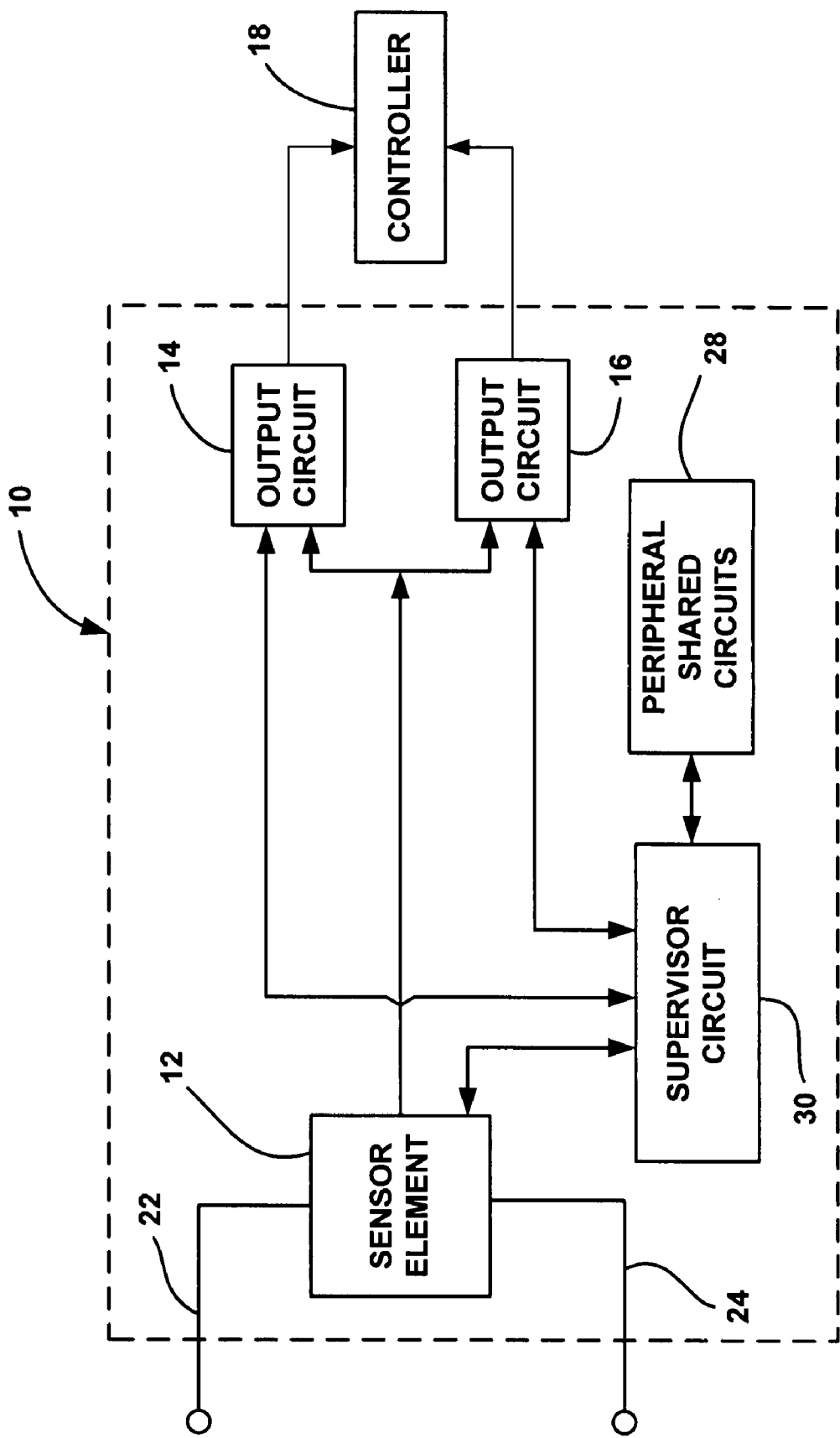
FIG. 2 is a schematic block diagram of an alternate embodiment of a sensing system including one sensor element and multiple outputs.

The output signal of the sensor element 12 is typically an analog voltage signal, and is applied to a series of shared circuits 26 associated with the system 10. The shared circuits 26 can be any necessary circuits that are shared by both of the output circuits 14 and 16, such as amplifiers, analog-to-digital converters, filters, etc. In certain designs, there may not be any shared circuits between the output circuits 14 and 16. Such an embodiment is shown in FIG. 2 of the present application wherein an alternate embodiment of the sensing system 100 is shown without shared circuitry. The sensor system 10 can also include peripheral circuits 28 that are necessary for the operation of the system 10, such as oscillators, amplifiers, etc. One of normal skill in the art would readily recognize the various circuits that would need to be provided in the shared circuits 26 and the peripheral shared circuits 28 for the particular sensing system.

The output circuits 14 and 16 provide the multiple output signals of the system 10, and include appropriate output circuitry, such as digital-to-analog converters, driver circuitry, etc. The output signals from the output circuits 14 and 16 can change differently in response to the measured parameter, as discussed above for the known multiple output circuits of the prior art. This is depicted in FIG. 1 by output signal Os' and Os" which are represented by dotted line. For example, the output signals could vary as a function of angular position and could have similar or opposing slopes, i.e. one output signal could vary from 0.5 to 4.65 volts and the other output signal could vary from 4.5 to 0.35 volts within the total angular range of the throttle body as a function of the measured parameter.

A supervisor circuit 30 monitors the operation of the various circuits within the system 10, including the sensor element 12, the shared circuits 26, and the peripheral shared circuits 28. The supervisor circuit 30 can be any type of circuit that is able to monitor the operating conditions of the circuits within the system 10, and many types of circuits would be applicable for this purpose, as would be appreciated by those skilled in the art.

The sensor element 12 will provide a signal within a certain range during normal operation. Therefore, if the output signals from the output circuits 14 and 16 are not within this range, i.e., are in a diagnostic range, the controller 18 will know that a problem exists, and will take the necessary and predetermined steps, such as provide a warning light on the vehicle dashboard, go into a safe limp home mode, shut the engine down, etc. If a circuit component within the shared circuits 26 or the peripheral shared circuits 28 fails, then the supervisor circuit 30 will provide an output to the controller 18 through the output circuits 14 and 16 to indicate a problem. For example, a failure of any shared circuit 26 could result in a diagnostic output signal of the two output signals between 0 and 0.25 volts or 4.75 and 5 volts. The controller 18 can then take the appropriate action for this type of a failure. Also, if any of the connectors between the supply line 22 and the sensor element 12 or the ground line 24 and the sensor element 12, or the connections between the output circuits 14 and 16 and the controller 18 fail, the controller 18 will respond accordingly because the output signal of one or both of the output circuits 14 and 16 will be outside the normal operating range of the sensing system 10.

Thus, the system 10 can provide the multiple output signals for diagnostic purposes to monitor the various conditions of the system 10, without providing two sensor elements. Because a single sensor element is provided, that sensor element and the associated circuits discussed above can be provided on the same integrated circuit chip, thus saving chip cost.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A sensing system for measuring a parameter, said system comprising:
   a single sensor element, said single sensor element providing a sensor signal that varies with the measured parameter;
   a first output circuit responsive to the sensor signal and providing a first output signal;
   a second output circuit responsive to the sensor signal and providing a second output signal, wherein the first and second output signals are two of multiple outputs from the single sensor element, and wherein the first output circuit and the second output circuit change the sensor signal in a different manner so that the first output signal and the second output signal change differently from each other during normal operation of the system; and
   a supervisor circuit, said supervisor circuit monitoring the sensor element and the output circuits, said supervisor circuit forcing the first or second output signals to change to a diagnostics range in response to an electrical failure with the sensor element or the output circuits and combinations thereof.

2. The system according to claim 1 further comprising shared circuits coupled to the sensor element in the first and second output circuits, said shared circuits including circuit elements used by both the first and second output circuits.

3. The system according to claim 1 wherein the sensor element is selected from the group consisting of Hall-effect sensors, inductive sensors, magneto-resistive sensors, encoders, and potentiometers.

4. The system according to claim 1 wherein the sensing system monitors the condition of a parameter or component in a vehicle.

5. The system according to claim 4 wherein the sensing system monitors a throttle plate position and a throttle body.

6. A sensing system for monitoring a parameter of a vehicle, said system comprising:
   a single sensor element for sensing the parameter, said single sensor element providing a sensor signal;
   shared circuits coupled to the sensor element, said shared circuits providing sensing system operations;
   a first output circuit responsive to the sensor signal from the shared circuits, said first output circuit providing a first output signal;
   a second output circuit responsive to the sensor signal from the shared circuits, said second output circuit providing a second output signal, wherein the first and second output signals are multiple outputs from the sensor element; and
   a supervisor circuit, said supervisor circuit monitoring the sensor element, output circuits, and the shared circuits, said supervisor circuit forcing the first or second output signals to change to a diagnostics range in response to an electrical failure with the sensor element, the output circuits, or the shared circuits and combinations thereof.

7. The system according to claim 6 wherein the sensor element is selected form the group consisting of Hall-effect sensors, inductive sensors, magneto-resistive sensors, encoders and potentiometers.

8. The system according to claim 6 wherein the sensing system monitors a throttle plate position in a throttle body.

9. A sensing system for measuring a parameter, said system comprising:
   a single sensor element, said single sensor element providing a sensor signal that varies with the measured parameter;
   a first output circuit responsive to the sensor signal and providing a first output signal;
   a second output circuit responsive to the sensor signal and providing a second output signal, wherein the first and second output signals are two of multiple outputs from the sensor element; and
   a supervisor circuit, said supervisor circuit monitoring the sensor element and the output circuits, said supervisor circuits forcing the first or second output signals to change to a diagnostics range in response to an electrical failure with the sensor element or the output circuit and combinations thereof.

10. The system according to claim 9 wherein the first output circuit and the second output circuit change the sensor signal in a different manner so that the first output signal and the second output signal change differently from each other during normal operation of the system.

11. The system according to claim 9 further comprising shared circuits coupled to the sensor element in the first and second output circuits, said shared circuits including circuit elements used by both the first and second output circuits.

12. The system according to claim 9 wherein the sensor element is selected from the group consisting of Hall-effect sensors, inductive sensors, magneto-resistive sensors, encoders, and potentiometers.

13. The system according to claim 9 wherein the sensing system monitors the condition of a parameter or component in a vehicle.

14. The system according to claim 13 wherein the sensing system monitors a throttle plate position and a throttle body.

15. A sensing system for measuring a parameter, said system comprising:
   a single sensor element, said single sensor element providing a sensor signal that varies with the measured parameter;
   a first output circuit responsive to the sensor signal and providing a first output signal;
   a second output circuit responsive to the sensor signal and providing a second output signal, wherein the first and second output signals are two of multiple outputs from the sensor element;
   a supervisor circuit, said supervisor circuit monitoring the sensor element and the output circuits, said supervisor circuit forcing the first or second output signals to change to a diagnostics range in response to an electrical failure with the sensor element or the output circuit and combinations thereof; and
   wherein the first output circuit and the second output circuit change the sensor signal in a different manner so that the first output signal and the second output signal change differently from each other during normal operation of the system.

16. The system according to claim 15 further comprising shared circuits coupled to the sensor element in the first and second output circuits, said shared circuits including circuit elements used by both the first and second output circuits.

17. The system according to claim 15 wherein the sensor element is selected from a group consisting of Hall-effect sensors, inductive sensors, magneto-resistive sensors, encoders, and potentiometers.

18. The system according to claim 15 wherein the sensing system monitors the condition of a parameter or component in a vehicle.

19. The system according to claim 18 wherein the sensing system monitors a throttle plate position and a throttle body.

20. A method of sensing a parameter, said method comprising:
   sensing the parameter with a single sensor element and providing a sensor signal indicative of the parameter;
   applying the sensor signal to a first output circuit, said first output circuit providing a first output signal indicative of the sensed condition;
   applying the sensor signal to a second output circuit, said second output circuit providing a second output signal indicative of the sensed condition, wherein the first and second output signals are two of multiple outputs from the sensor element; and,
   monitoring the operation of the output circuits and the single sensor element by a supervisor circuit, said supervisor circuit forcing the first output signal or the second output signal into a diagnostic range in response to an electrical failure with the sensor element or the output circuits and combinations thereof.

21. The method according to claim 20 further comprising applying the sensor signal to shared circuits before applying the sensor signal to the first and second output circuits.

22. The method according to claim 20 wherein the first output circuit and the second output circuit change the sensor signal in a different manner so that the first output signal and the second output signal change differently from each other during their normal operation of the system.

23. The method according to claim 20 wherein the parameter is the position of a throttle plate.

24. A method of sensing a parameter, said method comprising:
   sensing the parameter with a single sensor element and providing a sensor signal indicative of the parameter;
   applying the sensor signal to a first output circuit, said first output circuit providing a first output signal indicative of the sensed condition;
   monitoring the operation of the output circuits and the signal sensor element by a supervisor circuit, said supervisor circuit forcing the first output signal or the second output into a diagnostics range in response to an electrical failure with the sensor element of the output circuits and combinations thereof; and
   applying the sensor signal to a second output circuit, said second output circuit providing a second output signal indicative of the sensed condition, wherein the first and second output signals are two of multiple outputs from the sensor element and the first output circuit and the second output circuit change the sensor signal in a different manner so that the first output signal and the second output signal change differently from each other during normal operation of the system.

25. The method according to claim 24 further comprising applying the sensor signal to shared circuits before applying the sensor signal to the first and second output circuits.

26. The method according to claim 24 wherein the parameter is the position of a throttle plate.

27. A sensing system for monitoring a parameter of a vehicle, said system comprising:
   a single sensor element for sensing the parameter, said single sensor element providing a sensor signal;
   shared circuits coupled to the sensor element, said shared circuits providing sensing system operations;
   a first output circuit responsive to the sensor signal from the shared circuits, said first output circuit providing a first output signal;
   a second output circuit responsive to the sensor signal from the shared circuits, said second output circuit providing a second output signal, wherein the first and second output signals are multiple outputs from the sensor element;
   a supervisor circuit, said supervisor circuit monitoring the sensor element and the output circuits, said supervisor circuits forcing the first or second output signals to change to a diagnostics range in response to an electrical failure with the sensor element or the output circuit and combinations thereof; and
   wherein the first output circuit and the second output circuit change the sensor signal in a different manner so that the first output signal and the second output signal change differently from each other during normal operation of the system.

28. The system according to claim 27 wherein the sensor element is selected form the group consisting of Hall-effect sensors, inductive sensors, magneto-resistive sensors, encoders and potentiometers.

29. The system according to claim 27 wherein the sensing system monitors a throttle plate position in a throttle body.

30. A sensing system for measuring a parameter for a controller, said system comprising:
 a single sensor element, said single sensor element providing a sensor signal that varies with the measured parameter;
 a first output circuit responsive to the sensor signal and providing a first output signal to said controller;
 a second output circuit responsive to the sensor signal and providing a second output signal to said controller, wherein the first and second output signals are two of multiple outputs from the single sensor element, and wherein the first output circuit and the second output circuit change the sensor signal in a different manner so that the first output signal and the second output signal change differently from each other during normal operation of the system; and
 a supervisor circuit, said supervisor circuit monitoring the sensor element and the output circuits, said supervisor circuit forcing the first or second output signals to change to a diagnostics range in response to an electrical failure with the sensor element or the output circuits and combinations thereof.

31. A method of sensing a parameter for a controller, said method comprising:
 sensing the parameter with a single sensor element and providing a sensor signal indicative of the parameter;
 applying the sensor signal to a first output circuit, said first output circuit providing a first output signal indicative of the sensed condition to said controller;
 applying the sensor signal to a second output circuit, said second output circuit providing a second output signal to said controller iIndicative of the sensed condition, wherein the first and second output signals are two of multiple outputs from the sensor element; and,
 monitoring the operation of the output circuits and the single sensor element by a supervisor circuit, said supervisor circuit forcing the first output signal or the second output signal into a diagnostic range in response to an electrical failure with the sensor element or the output circuits and combinations thereof.

* * * * *